US006839403B1

(12) United States Patent
Kotowski et al.

(10) Patent No.: US 6,839,403 B1
(45) Date of Patent: Jan. 4, 2005

(54) GENERATION AND DISTRIBUTION OF ANNOTATION OVERLAYS OF DIGITAL X-RAY IMAGES FOR SECURITY SYSTEMS

(75) Inventors: Andreas F. Kotowski, Rancho Palos Verdes, CA (US); Khai Minh Le, Huntington Beach, CA (US); Douglas Roy Gillard-Hickman, Crowborough (GB)

(73) Assignee: Rapiscan Security Products (USA), Inc., Hawthorne, CA (US)

( * ) Notice: Subject to any disclaimer, the term of this patent is extended or adjusted under 35 U.S.C. 154(b) by 0 days.

(21) Appl. No.: 09/904,169

(22) Filed: Jul. 11, 2001

Related U.S. Application Data

(60) Provisional application No. 60/220,531, filed on Jul. 24, 2000.

(51) Int. Cl.⁷ .............................................. G01N 23/04
(52) U.S. Cl. ........................................................ 378/57
(58) Field of Search .......................... 378/53, 57, 98.2, 378/4, 22

(56) References Cited

U.S. PATENT DOCUMENTS

| | | | | | |
|---|---|---|---|---|---|
| 4,216,499 A | * | 8/1980 | Kunze et al. | ............. | 378/98.2 |
| 4,688,175 A | * | 8/1987 | Kaneko et al. | ............. | 600/406 |
| 4,872,187 A | * | 10/1989 | Nakahata et al. | ............... | 378/4 |
| 5,097,492 A | * | 3/1992 | Baker et al. | .................. | 378/22 |
| 5,260,982 A | | 11/1993 | Fujii et al. | | |
| 5,654,555 A | * | 8/1997 | Buytaert et al. | ............ | 250/581 |
| 5,838,758 A | * | 11/1998 | Krug et al. | .................... | 378/53 |
| 5,875,226 A | * | 2/1999 | Yokouchi et al. | .......... | 378/98.2 |
| 5,974,111 A | * | 10/1999 | Krug et al. | .................... | 378/57 |
| 6,088,423 A | * | 7/2000 | Krug et al. | .................... | 378/57 |
| 6,370,222 B1 | | 4/2002 | Cornick, Jr. | | |

* cited by examiner

*Primary Examiner*—Max Noori
(74) *Attorney, Agent, or Firm*—Thelen Reid & Priest LLP; David B. Ritchie

(57) ABSTRACT

An image display storage and retrieval system provides a mechanism to transmit x-ray images of parcels to one or more remote workstations. The images may be annotated at these workstations to specifically identify articles to be targeted for more thorough investigation. The image display storage and retrieval system comprises an x-ray image source to illuminate a parcel with x-rays, scan the received x-ray pattern produced from the x-rays passing through the parcel, and digitize the x-ray image of the parcel, an initial screening station where images are initially received and may be annotated, an inspection station where the images (with or without annotation) and parcels to be inspected are received, an optional parcel path switch to direct parcels to either a clearance station or an inspection station, a data storage and retrieval device to record and retrieve images, a data processor to receive the images and a data network connecting the initial screening station, the inspection station, the optional path switch, the data storage and retrieval device and the data processor so as to enable the exchange of data.

27 Claims, 2 Drawing Sheets

GENERATION AND DISTRIBUTION OF ANNOTATION OVERLAYS OF DIGITAL X-RAY IMAGES FOR SECURITY SYSTEMS

RELATED U.S. APPLICATION DATA

This application claims the benefit of U.S. Provisional Patent Application Ser. No. 60/220,531 filed on Jul. 24, 2000.

FIELD OF THE INVENTION

The present invention relates to an image display storage and retrieval system. More specifically, the invention relates to x-ray image annotation and transmission over a network for security systems.

BACKGROUND OF THE INVENTION

Security at high traffic installations such as airport terminals typically requires inspection of parcels passing certain checkpoints. Travelers generally prefer to avoid lengthy delays imposed by such inspections. Hence, in order to expedite inspection within the shortest period of time and with a minimum of privacy infringement, security systems have been established to screen the parcels, by radiating x-rays through the parcels to a detector to produce an image. This image can be viewed by a security agent on an image display device, and if found innocuous, will result in the package being passed on for delivery to the traveler or the transport. If the image suggests further inspection is required, the package may be isolated from others and physically searched in more detail to ascertain and assess its contents.

Carry-on parcels to be screened at an airport are usually inspected via an x-ray screening system. Passengers' place parcels onto an input conveyor belt. The belt transports the parcels through the inspection system, which x-rays the parcels and presents images to the x-ray system operator displaying the contents of the parcels on a video monitor. When the x-ray system operator observes a potentially prohibited item appear on the monitor, he may provide a signal to a search operator. This signal may constitute an oral statement, or be exhibited as an audio or visual alarm indicator implemented electronically via a push-button that provides a delayed indication when the parcel in question reaches the exit of the x-ray system. The identity of the parcel to be further examined is sometimes not clearly indicated. On occasion, the search operator examines a parcel that does not conform to the parcel the x-ray system operator intended when the alarm was initiated. Additionally, the search operator has no indication of what is in the parcel to be searched, or what aroused the x-ray operator's suspicion. On occasion, this may permit a parcel that should be physically searched for a particular potential item of contraband to escape the physical inspection process.

One solution proposed in the past includes transmitting an integrated image from multiple x-ray emitters to record on a video disk and transfer to a monitor for continuous display, from which it can be sent by a monitor operator to a parcel sorter who diverts the parcel to a separate inspection desk for further examination. A more effective method to properly identifying parcels to be segregated from others for more detailed inspection is needed in the security industry.

BRIEF DESCRIPTION OF THE INVENTION

An image display storage and retrieval system provides a mechanism to transmit x-ray images of parcels to one or more remote workstations. The images may be annotated at these workstations to specifically identify articles to be targeted for more thorough investigation. The image display storage and retrieval system comprises an x-ray image source to illuminate a parcel with x-rays, scan the received x-ray pattern produced from the x-rays passing through the parcel, and digitize the x-ray image of the parcel, an initial screening station where images are initially received and may be annotated, an inspection station where the images (with or without annotation) and parcels to be inspected are received, an optional parcel path switch to direct parcels to either a clearance station or an inspection station, a data storage and retrieval device to record and retrieve images, a data processor to receive the images and a data network connecting the initial screening station, the inspection station, the optional path switch, the data storage and retrieval device and the data processor so as to enable the exchange of data.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
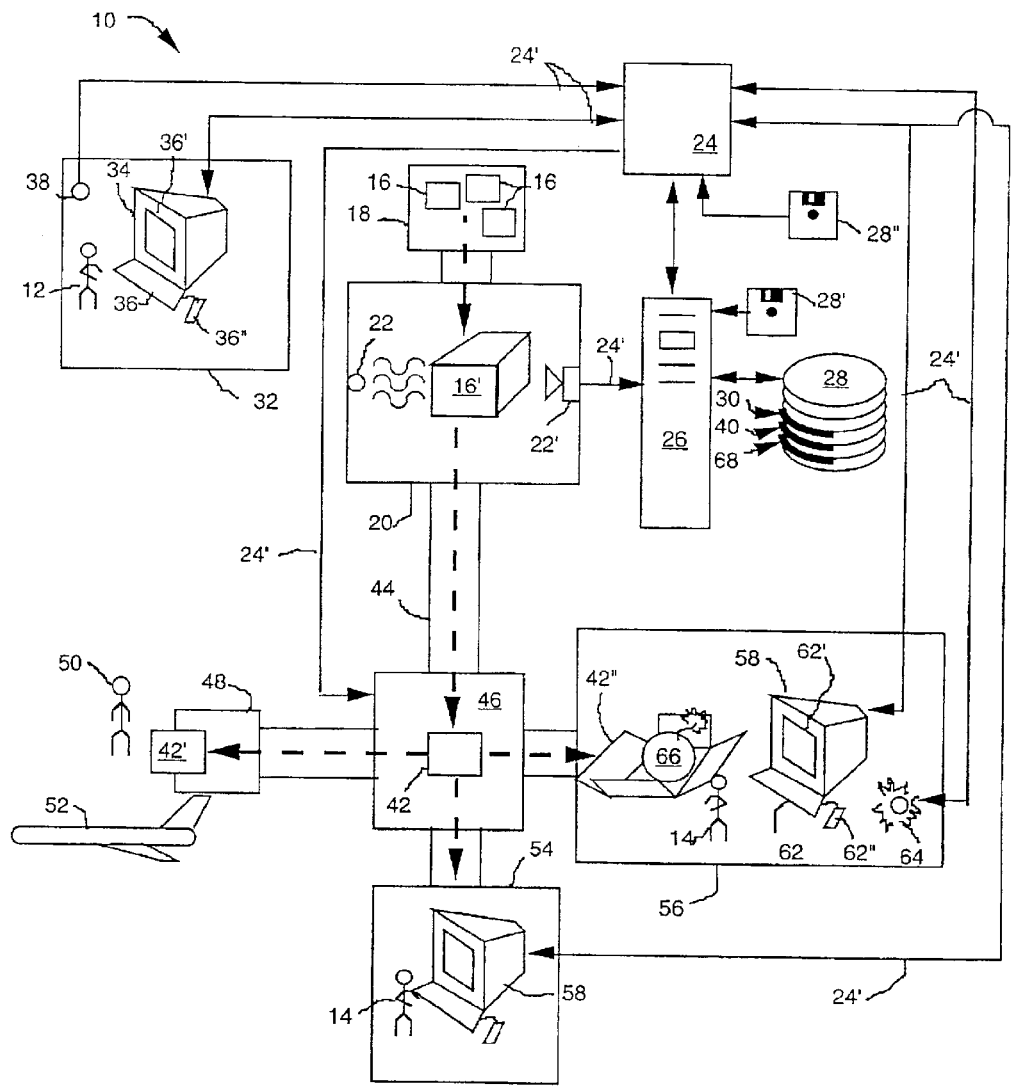
FIG. 1 is a system block diagram of an image display storage and retrieval system according to a presently preferred embodiment of the invention.

Embodiments of the present invention are described herein in the context of a Search Workstation Display. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "network" includes local area networks, wide area networks, metropolitan area networks, the Internet, cable television systems supporting bi-directional data communication, telephone systems, wireless data telecommunications systems, fiber optic networks, ATM (asynchronous transfer mode) networks, frame relay networks, satellite data telecommunications networks, and the like. Such networks are well known in the art and consequently are not further described herein.

The present invention is directed to distributing digital images of x-ray scans to one or more workstations in order to facilitate identification of possible contraband. The image display storage and retrieval system comprises an x-ray image source to illuminate a parcel with x-rays, scan the received x-ray pattern produced from the x-rays passing through the parcel, and digitize the x-ray image of the parcel. The original x-ray image is created by a scanner in the form of a digital image and stored digitally on a data storage and retrieval device. A data network enables one or more stations to access and annotate the digital image. In sending an annotated image to an inspection station, visual clues identifying the articles attracting attention or suspicion may be appended to the image in digital form. In addition, the annotated image can be sent in more than one direction. Instead of being restricted to image transmission from a scanning station to a searching station; the digital image (in original form or with appended annotation reference marks) may be sent from any station to any other station on the network.

The present invention provides a search operator with the scanned x-ray image that the x-ray operator may have observed at the time of initiating the alarm for a search response. A digital scan system creates a digital x-ray image, which can be annotated by an operator and be transmitted over a network to enable multiple search workstations to access the digital image. In addition, the system may function in conjunction with the Threat Image Projection (TIP) system, so that an archived image featuring particular contraband for training identification may be substituted on a selected basis. FIG. 1 illustrates a diagram of a presently preferred embodiment of the present invention. A security system 10 for screening and inspection is depicted as equipment support for one or more x-ray screen operators 12 and one or more search operators 14. Several parcels 16 are located at the loading station 18. A parcel 16' enters a x-ray scanning chamber 20, which may include a x-ray emitter 22 and a camera 22' to register a x-ray image, which may be scanned into a digital form. This digital x-ray image may be transmitted via the network server 24 via network connections 24' to a computer 26 capable of data processing and recorded on a storage and retrieval device 28. Software to enable annotation overlay of images, message text composition, image compression and decompression, and other related functions may be provided by a storage medium 28'. This software may be loaded and executed by the computer 26 after being loaded by storage medium 28. Additional software for Intranet transmission of images between stations may be made available on a storage medium 28" to the network server 24. The storage retrieval device 28 for reading and/or writing data may use magnetic or optical media 28', such as for example a hard-disk drive, magnetic tape or DVD for permanent archival storage of image data or software, or CD-ROM or flash memory for interactive retrieval of image data or rapid access to software, such as decompression applications.

The network may include software to perform as a distributed system so as to render the file transfer automatic to the workstation operators. The transmission may incorporate a local area network (LAN) with an arbitration mechanism to control message sequencing and may be centralized or distributed. One example of a decentralized bus-based broadcast system is the IEEE 802.03 standard called Ethernet™. In one preferred embodiment of the present invention, the use of the network server 24 as a central controller, the network connections 24' may comprise twisted pair wire such as 10Base-T. An alternate embodiment may use cable such as 10Base-2 (thin Ethernet) or 10Base-F (fiber optic). Another preferred embodiment of the present invention may incorporate a token ring under the IEEE 802.5 standard used in digital applications. The protocol for such a system may include Transmission Control Protocol (TCP) with an Internet Protocol (IP) packet format, typically expressed as a TCP-IP network. An alternate LAN package used for personal computers (PC) may be Novell Netware® in which each PC functions as a client. Another alternate LAN package used between Apple® platforms may be IEEE 1394 known as FireWire™. Alternatively, a wireless network system may be used in which network connections 24' may represent infrared signal transmitted from one workstation to the network server 24 and vice versa. These examples are not considered limiting, and many other network arrangements may be considered without departing from the present invention.

The digital x-ray scan of parcel 16' is preferably stored in an addressed first memory location 30 on the recorder 28. The network server 24 causes the network connections 24' to transmit the digital scanned x-ray image to an initial screening workstation 32. This transmission may be performed contemporaneously with the capture of the scanned x-ray image. The screen monitor 34 at screening terminal or workstation 32 displays the digital scanned x-ray image to the screen operator 12. The screening workstation 32 may include one or more devices for annotating the x-ray image to produce a first annotated image, including a keyboard 36, touch screen 36', and/or cursor tracing device 36" (e.g., trackpad, mouse, joystick). This first annotated image may be composed of the digital scanned x-ray image in original form plus a first overlay image featuring the annotation supplied by the screen operator 12. The first annotated image may constitute a single image file or form the first overlay combined with a data call to the digital scanned x-ray image, such as by accessing an alias to that image. The latter arrangement separating the overlay and the original image may consume less data storage than a combined image storage. This is due to the generally much smaller storage requirements for an annotation layer than the digital scanned x-ray image due to the larger quantity of image data registered on the digital scanned x-ray image, even when compressed using glossy image compression techniques well known in the art. In addition, the screening workstation 32 may include an alarm initiator 38, such as a push-button or toggle switch, which may be activated by the screen operator 12 sending an alarm signal to the computer 26 when a parcel 16' is suspected to contain contraband. The alarm initiator 38 may be set to off, on and reset positions. The first annotated image is transmitted over the network connections 24' controlled via the network server 24 to the computer 26 to be stored in digital form in recorder 28 in an addressed second memory location 40. The screen operator 12 may maintain the scanned x-ray image of parcel 16' on the screen monitor 34, or may clear the digital scanned x-ray image or the first annotated x-ray image by means of a button or toggle or similar-on-off device to enable receipt of a scanned x-ray image from a subsequent parcel or from the archive.

After passing through the x-ray chamber 20, the scanned parcel 42 may be disposed along a conveyor 44 or other similar transport mechanism to a path switch or diverter 46. In the absence of an alarm signal from the screen operator 12, a parcel 42' may be sent by default to a clearance station 48 to be retrieved by the traveler 50 or loaded onto an awaiting transport 52. When the screen operator 12 sends an alarm signal from alarm initiator 38 transmitted across the network connectors 24', the scanned parcel 42" may be diverted to an available inspection station 54 or 56 for physical examination by a search operator 14. The computer 26 may impose a delay across the network connectors 24' of alarm signal at the inspection station 56 until the scanned parcel 42" reaches the inspection station 56.

The annotated x-ray image or annotation overlay image may be stored in second memory location 44 from the recorder 28. From the screening workstation or the memory storage, this image may be transmitted over the network connections 24' controlled via the network server 24 to the inspection station 56 with a search monitor 58 observable to the search operator 14. The inspection station 56 with a search monitor 58 observable to the search operator 14. The inspection station 56 may also include one or more devices for annotating the first annotated or scanned x-ray image to produce a second annotated image, including a keyboard 62, touch screen 62', and/or cursor tracking device 62" (e.g., trackpad, mouse, joystick). The second annotated image may constitute a single image file or form the second and/or first overlays combined with a data call to the digital scanned x-ray image, such as by accessing an alias to that image. The latter arrangement separating the overlays and the original image may consume less data storage than a combined image storage. In addition, the search operator 14 may have access to an alarm indicator 64 at the inspection station 56, such as a colored light switched on and/or an audio tone, to receive an alarm signal sent from the screen operator 12 via the alarm initiator 38 across the network connectors 24'. The alarm indicator 64 may include reset position and an acknowledgement signal to alarm initiator 38 via the network connectors 24'.

Once the parcel 42" has reached the inspection station 56, the search operator 14 may then open the parcel 42" and inspect its contents to determine whether suspected contraband 66 can be observed and located. The search operator 14 may annotate the digital scanned x-ray image or the first annotated image to produce a second annotated image describing the suspected contraband 66. The second annotated image may be transmitted over the network connectors 24' to the computer 26 to be stored in digital form I recorder 28 in an addressed third memory location 68 for further retrieval and evaluation regarding legal consequences. This second annotated image may be composed of the digital scanned x-ray image in original form plus a second overlay image featuring the annotation supplied by the search operator 14 and/or the first overlay image. The search operator 14 may then clear the displayed annotated x-ray image from the search monitor 58 by means of a button or toggle or similar on-off device to enable receipt of a subsequent image, whether from archive or from the screen operator 12. The second annotated image may be send by the search operator to the screening operator as an acknowledgement of the attention drawn to the parcel identified for examination.

FIGS. 2A through 2F illustrate an example of image annotation. The digital scanned x-ray image shown on screen monitor 34 is illustrated as a scanned x-ray image 70 may be displayed on a screening video monitor in FIG. 2A. A duplicate scanned x-ray image 72 may be displayed on a search video monitor in FIG. 2B. Within the scanned x-ray image 70 one may observe the outline of a suitcase 78 with the handle 80 on the bottom side. The contents displayed by the scanned x-ray image 70 include what appear to be a comb 82, a tube of toothpaste 84, a toothbrush 86, a possible handgun 88 and an unidentified item 90. This scanned x-ray image 70 may be transmitted over the network, stored in the data storage device, and transmitted via the retrieval device to the screening workstation or console.

Figure 2A:
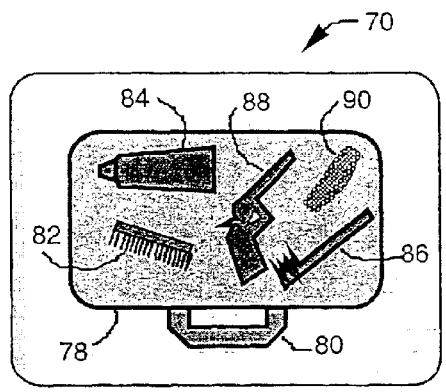
FIG. 2A is an image diagram of an x-ray image to the screening station to be annotated according to a presently preferred embodiment of the invention.
Figure 2B:
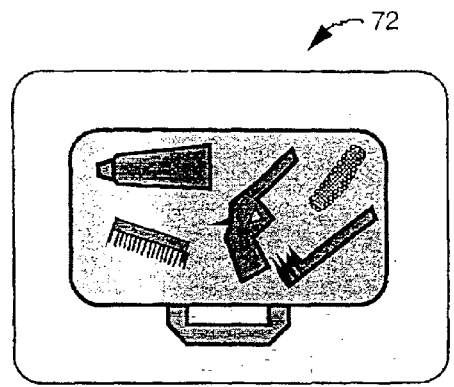
FIG. 2B is an image diagram of an x-ray image to the search station to be annotated according to a presently preferred embodiment of the invention.
Figure 2C:
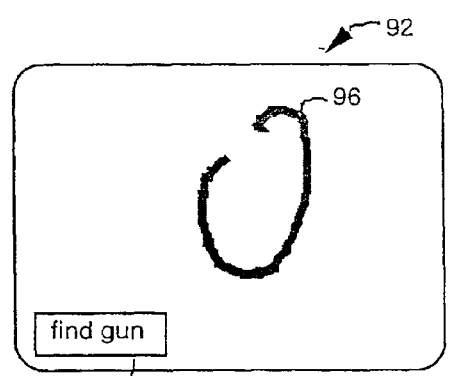
FIG. 2C is an image diagram of example annotation markings produced at the screening station according to a presently preferred embodiment of the invention.
Figure 2D:
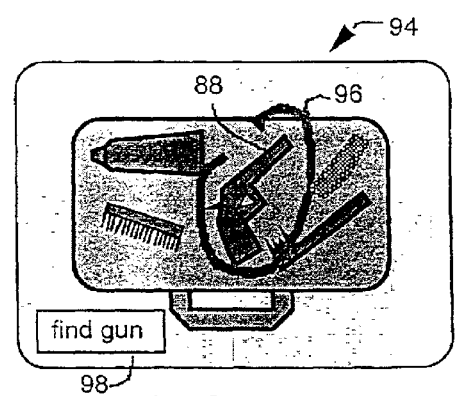
FIG. 2D is an image diagram of an x-ray image combined with example annotation markings produced at the screening station according to a presently preferred embodiment of the invention.
Figure 2E:
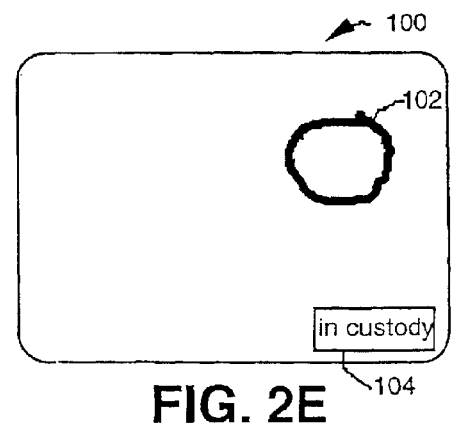
FIG. 2E is an image diagram of example annotation markings produced at the search station according to a presently preferred embodiment of the invention.
Figure 2F:
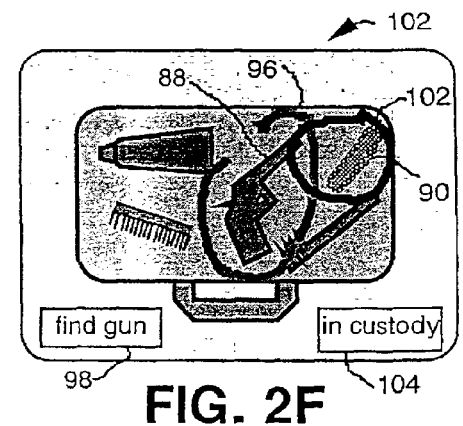
FIG. 2F is an image diagram of an x-ray image combined with example annotation markings produced at the screening and search stations according to a presently preferred embodiment of the invention.

The screening operator may proceed to annotate the scanned x-ray image 70 which when displayed independently of the scanned x-ray image may be illustrated in FIG. 2C as an annotation overlay layer 92. When combined with the scanned x-ray image 70, the screening operator may produce a screen annotated image 94 in FIG. 2D. An image annotation software executable program, such as Adobe® Photoshop® may be may be used to enable an operator to create illustrating features such as lines on the workstation screen as an overlay image which when superimposed over the scanned x-ray image 70 to produce the screen annotated image 94. A point-tracking device, such as a touch screen, trackpad, joystick or mouse, may be used to trace a screen identifying mark 96 to specify the article in the suitcase of interest using the image annotation software. In this example, the screen identifying mark 96 is drawn around the possible handgun 88. A keyboard entry may enable the screening operator to compose a text-based instruction 98 on the overlay image to the search operator. The screen annotation layer 92 may be stored in the data storage device and transmitted over the network to the search monitor as an overlay to be superimposed over the duplicate x-ray image 72. The screen annotation overlay 92 may then be transmitted over the network, stored and accessed in the data storage and retrieval device to the search workstation to be superimposed on the duplicate scanned x-ray image 72 displayed on the search monitor. Alternatively, a screen annotated image 94 featuring the scanned x-ray image 70 with the annotation layer 92 may be transmitted over the network.

An overlay image may be stored a separate file distinguished from the scanned x-ray image 70, whereas the screen annotated image 94 might represent a combined image displayed on a monitor. In one embodiment, the overlay image might undergo GIF compression as a graphic to reduce data storage requirements. Additionally, or alternatively, the scanned x-ray image 70 might undergo JPEG compression as a photograph to reduce data storage requirements. The overlay image and the scanned x-ray image 70 might be hyperlinked to URL links for retrieval within a local area network (LAN) or an Intranet system.

The search operator may physically examine the contents of the depicted suitcase 78. From the screen identifying mark 96 and/or the instruction 98, the search operator may be made aware of the reasons why the screen operator did not permit this suitcase 78 to proceed to the clearance station. The search operator may proceed to annotate the screen annotated image 94 displayed to produce a search annotation overlay 100 in FIG. 2E. The search annotation overlay 100 may be superimposed over the screen annotated image 94 yielding a search annotated image 102 in FIG. 2F. Once the search operator physically confirms that the possible handgun 88 is actually a firearm prohibited in the security area, a keyboard entry may be used to compose a text-based response 104 to the instruction 98. Furthermore, the search operator may on further investigation, discover the unidentified item 90 constitutes a switchblade knife, also prohibited, and may proceed to encircle that item in the search annotation 100 by a search identifying mark 106. The search annotated layer 100 may then be transmitted over the network and stored I the data storage and retrieval device for future archive.

The digital scanned x-ray image, which may or may not be annotated with an annotation layer by the x-ray operator or the screening operator, may be transmitted over the network to one or more search operators and may be synchronized with the alarm signal to authorize a physical examination or search of the parcel identified by the alarm. The digital scanned x-ray image with or without an overlay image may be presented on a search monitor as a search display image until the search display image is cleared from the monitor screen by a switch actuated by the search operator. The search operator may verify that the parcel being searched matches the search display image on the search monitor. The search display image of the digital scanned x-ray image on the search monitor will facilitate the search operator in examining the parcel. Meantime, x-ray inspection of subsequent parcels may continue uninterrupted by the x-ray operator with the x-ray screening system. If one or more subsequent parcels need to be physically examined before examination of the first parcel is completed, the x-ray screening system may be paused until the search station may be available or an additional search station becomes available.

The scanned x-ray image may be produced as or converted to a digital image and stored on a computer or an alternate electromagnetic, optical or electronic storage device. This storage device may save the image and/or transmit the image via the network to another device such as a computer for the search workstation platform. The image may be digitized, encrypted, annotated, reassembled and/or stored as a packet for data protection. By recording digital data rather than analog data, the expense of memory usage may be reduced and versatility in annotating images may be improved, thus facilitating the screen operator's task of identifying packages deemed suspect and warranting closer scrutiny. The particular image to be displayed on either the x-ray screen monitor or the search monitor may be selected. The status of the workstation platform may also be transmitted over the network, such as under TCP/IP other local area network (LAN) protocol.

Multiple search workstation platforms might be connected to the network in order to access the digital images available to multiple authorized personnel to expedite resolution of whether the suspect parcel contains contraband. If a digital image of a particular parcel being projected at the time of the search command is provided, the x-ray screening system may be paused in order to provide sufficient time to relocate that parcel, and prompt the x-ray operator for a clear or search response. This interruption command of the x-ray screening system may also be expanded to hold a plurality of parcels in queue, with resumption based on one or more selected criteria. Furthermore, the receipt and transmission of images may be controlled from a central site independent of the x-ray screen station and/or the inspection station.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. An image display storage and retrieval system comprising:
    an x-ray imager providing a digital x-ray image of at least one parcel;
    at least one screening station receiving said digital x-ray image and generating a screen annotation overlay wherein a combination of said digital x-ray image and, said screen annotation overlay produces a screen annotated image;
    at least one inspection station receiving said screen annotated image;
    a data storage and retrieval device recording said digital x-ray image and said screen annotated image;
    a data processor processing said digital x-ray image and said screen annotated image; and
    a data network coupling said x-ray image source, said at least one screening station, said at least one inspection station, said data storage and retrieval device and said data processor.

2. An image display storage and retrieval system according to claim 1 wherein at least one screening station further comprises an alarm signal generator to produce an alarm signal.

3. An image display and storage retrieval system according to claim 2 wherein at least one inspection station further comprises an alarm receiver to receive said alarm signal.

4. An image display and storage retrieval system according to claim 3 wherein said alarm signal is retarded from an operator at said at least one inspection station until said at least one parcel arrives at said inspection station.

5. An image display and storage retrieval system according to claim 2 further comprising a parcel path switch directing said at least one parcel to one of either a clearance station or said at least one inspection station and wherein said parcel path switch directs said at least one parcel to a destination based on said alarm signal further comprising:
    a positive alarm signal setting said destination to said at least one inspection station; and
    a negative alarm signal setting said destination to said clearance station.

6. An image display storage and retrieval system according to claim 1 wherein said at least one screening station further comprises:
    a view monitor displaying said digital x-ray image;
    an annotation instrument selected from the group consisting of a trackpad, touch screen, mouse, joystick and keyboard; and a control to remove said digital x-ray image from said view monitor.

7. An image display storage and retrieval system according to claim 1 wherein said screen annotation image is stored as separate files, a first said file comprising said digital x-ray image and a second said file comprising said screen annotation overlay.

8. An image display storage and retrieval system according to claim 1 wherein said at least one inspection station further comprises:
 a view monitor displaying said screen annotated image; and
 a control to remove said screen annotated image from said view monitor.

9. An image display and retrieval system according to claim 1 wherein said network further comprises:
 a network server; and
 a plurality of network connections connected to said network server.

10. An image display storage and retrieval system according to claim 1 wherein said data storage and retrieval device further includes:
 a storage medium selected from the group consisting of a hard-disk drive, magnetic tape, DVD, CD-ROM and flash memory.

11. An image display storage and retrieval system according to claim 1 wherein said at least one screening station further comprises:
 a view monitor displaying said digital x-ray image;
 an annotation instrument selected from the group consisting of a trackpad, touch screen, mouse, joystick and keyboard; and
 an alarm signal generator to produce an alarm signal.

12. An image display storage and retrieval system according to claim 11 wherein said at least one inspection station further comprises:
 a view monitor displaying said digital x-ray image;
 a control to remove said annotated image from said view monitor; and
 an alarm receiver to receive said alarm signal.

13. An image display storage and retrieval system comprising:
 an x-ray image source providing a digital x-ray image of at least one parcel;
 at least one screening station receiving said digital x-ray image and generating a screen annotation overlay wherein a combination of said digital x-ray image and said screen annotation overlay produce a screen annotated image;
 at least one inspection station receiving one of either said digital x-ray image or said screen annotated image and generating a search annotation overlay wherein a combination of said digital x-ray image and said screen annotation overlay and said search annotation overlay produce a search annotated image;
 a parcel path switch directing said at least one parcel to one of either a clearance station or said at least one inspection station;
 a data storage and retrieval device recording said digital x-ray image, said screen annotated image and said search annotated image;
 a data processor processing said digital x-ray image, said screen annotated image and said search annotated image; and a data network connecting to said digital x-ray image source, said at least one screening station, said at least one inspection station, said parcel path switch, sand data storage and retrieval device and said data processor, said network enabling exchange of data.

14. An image display storage and retrieval system according to claim 13 wherein at least one screening station further comprises an alarm signal generator to produce an alarm signal.

15. An image display and storage retrieval system according to claim 14 wherein at least one inspection station further comprises an alarm receiver to receive said alarm signal.

16. An image display and storage retrieval system according to claim 15 wherein said alarm signal is retarded from an operator at said at least one inspection station until said at least one parcel arrives at said inspection station.

17. An image display and storage retrieval system according to claim 13 wherein said parcel path switch directs said at least one parcel to a destination based on said alarm signal further comprising:
 a positive alarm signal setting said destination to said at least one inspection station; and
 a negative alarm signal setting said destination to said clearance station to said at least one inspection station.

18. An image display storage and retrieval system according to claim 13 wherein said screen annotation image is stored as separate files comprising said digital x-ray image and said screen annotation overlay.

19. An image display and retrieval system according to claim 13 wherein said network further comprises:
 a network server; and
 a plurality of network connections connected to said network server.

20. An image display storage and retrieval system according to claim 13 wherein said data storage and retrieval device further includes:
 a storage medium selected from the group consisting of a hard-disk drive, magnetic tape, DVD, CD-ROM and flash memory.

21. An image display storage and retrieval system according to claim 13 wherein said at least one inspection station further comprises:
 a view monitor displaying said search annotated image;
 a control to remove said annotated image from said view monitor; and
 an annotation instrument selected from the group consisting of a trackpad, touch screen, mouse, joystick and keyboard.

22. An image display storage and retrieval system according to claim 14 wherein said at least one inspection station further comprises:
 a view monitor displaying said x-ray image;
 a control to remove said search annotated image from said view monitor;
 an annotation instrument selected from the group consisting of a trackpad, touch screen, mouse, joystick and keyboard; and
 an alarm receiver to receive said alarm signal.

23. A method to store and retrieve at least one x-ray image comprising:
 providing a digital x-ray image of at least one parcel;
 receiving said digital x-ray image at an at least one screening station;
 generating a screen annotation overlay producing a screen annotated image from said digital x-ray image combined with said screen annotation overlay at said at least one screening station;

receiving said screen annotated image at an at least one inspection station;

directing said at least one parcel at a parcel path switch to one of either a clearance station or said at least one inspection station;

recording on a data storage and retrieval device said digital x-ray image and said screen annotated image;

retrieving on a data storage and retrieval device said digital x-ray image and said screen annotated image;

processing on a data processor said digital x-ray image and said screen annotated image; and coupling on a data network said x-ray image source, said at least one screening station, said at least one inspection station, said parcel path switch, said data storage device and retrieval device and said data processor, said network enabling exchange of data.

24. A method to store and retrieve at least one digital x-ray image according to claim 23 further comprising:

producing an alarm signal at said at least one screening station; and receiving said alarm signal at said at least one inspection station.

25. A method to store and retrieve at least one digital x-ray image according to claim 24 further comprising retarding said alarm signal from an operator to said at least one inspection station until said at least one parcel arrives at said inspection station.

26. A method to store and retrieve at least one digital x-ray image according to claim 24 wherein said directing said at least one parcel at a parcel path switch to one of either a clearance station or said at least one inspection station further comprises:

setting said destination to said at least one inspection station when said alarm signal is positive; and setting said destination to said clearance station when said alarm signal is negative.

27. A method to store and retrieve at least one x-ray image according to claim 23 further comprising:

generating a search annotated image from said screen annotated image at said at least one inspection station;

recording on said data storage and retrieval device said search annotated image;

retrieving on said data retrieval and retrieval device said search annotated image; and digitizing on said data processor said search annotated image.

* * * * *